United States Patent [19]

Fries et al.

[11] Patent Number: 4,975,041
[45] Date of Patent: Dec. 4, 1990

[54] DIE ASSEMBLY FOR DIE CASTING A PROPELLER STRUCTURE

[76] Inventors: Steven L. Fries, 8612 Herbst Rd., Winneconne, Wis. 54986; John E. Puhl, 10627 Wabash Ave., Milwaukee, Wis. 53224

[21] Appl. No.: 353,876

[22] Filed: May 18, 1989

[51] Int. Cl.⁵ .................. B29C 39/34; B29C 45/44; B29C 45/73
[52] U.S. Cl. .................. 425/547; 164/312; 164/342; 249/63; 249/66.1; 249/79; 249/122; 249/142; 249/162; 425/554; 425/577; 425/436 R; 425/441; 425/468
[58] Field of Search .......... 164/303, 312, 320, 340, 164/342, 344, 345, 403; 249/63, 66.1, 79, 122, 142, 161, 162; 425/182, 436, 441, 414, 577, 554, 547, 468; 264/318

[56] References Cited

U.S. PATENT DOCUMENTS

| | | | |
|---|---|---|---|
| 4,043,385 | 8/1977 | Petrenchik | 425/DIG. 5 |
| 4,414,171 | 11/1983 | Duffy et al. | 264/318 |
| 4,524,943 | 6/1985 | Busch et al. | 249/63 |
| 4,706,928 | 11/1987 | Hyll | 425/577 |

FOREIGN PATENT DOCUMENTS

| | | | |
|---|---|---|---|
| 1255139 | 1/1961 | France | 264/318 |
| 0447218 | 9/1975 | U.S.S.R. | 164/344 |
| 0197712 | 12/1977 | U.S.S.R. | 425/DIG. 5 |
| 1076183 | 2/1984 | U.S.S.R. | 164/340 |

Primary Examiner—Willard Hoag
Attorney, Agent, or Firm—Andrus, Sceales, Starke & Sawall

[57] ABSTRACT

A die assembly for die casting a propeller structure, such as a wax propeller pattern. The pattern, which is identical in configuration to a cast metal propeller to be produced, includes a generally cylindrical hub having an outwardly flared end and a plurality of blades project outwardly from the hub. The die assembly includes a base plate and a lower core section extends upwardly from the base plate through an opening in a stripper plate, which is mounted for movement toward and away from the base plate. A plurality of die sections are mounted for generally radial sliding movement on the stripper plate from an outer open position to a closed position where they define a die cavity with the core section. The die assembly also includes an upper die unit that is mounted for vertical movement and has a cavity in its lower surface which receives the upper ends of the die sections when in the closed position. An upper core section is carried by the upper die unit and mates with the lower core section when the upper die unit is lowered into interlocking relation with the die sections. Liquid wax is introduced through an ingate to the die cavity to form the wax propeller pattern. A mechanism is provided to rotate the lower core section and the wax pattern after the die sections have been moved to the open position to move the blades of the pattern to facilitate axial removal of the pattern.

27 Claims, 5 Drawing Sheets

FIG. 2
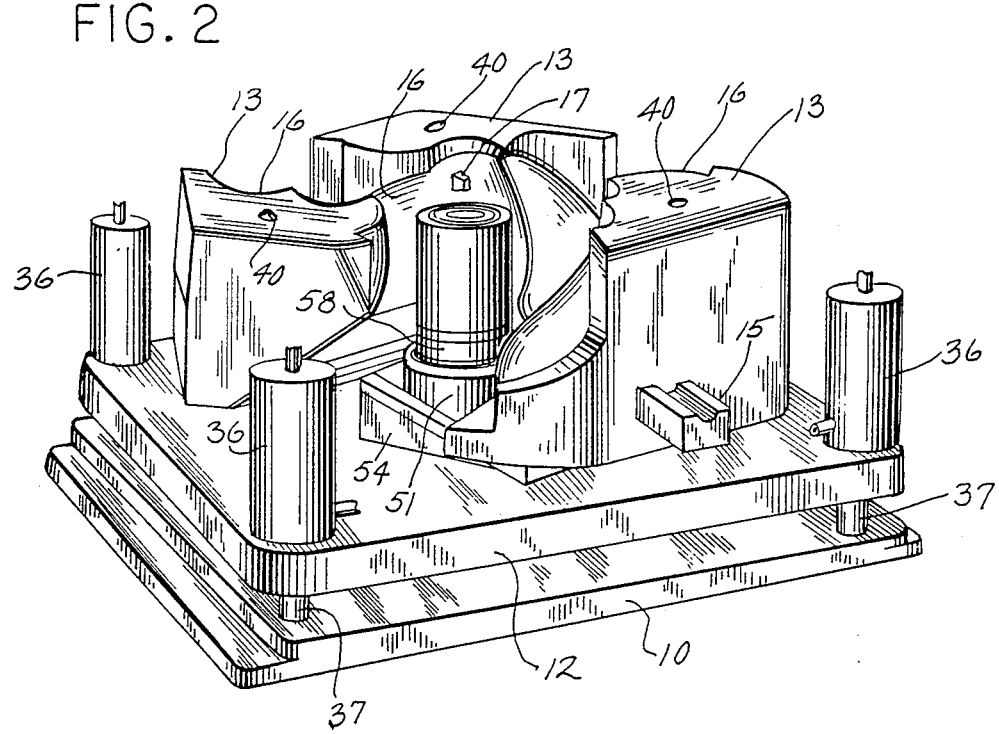
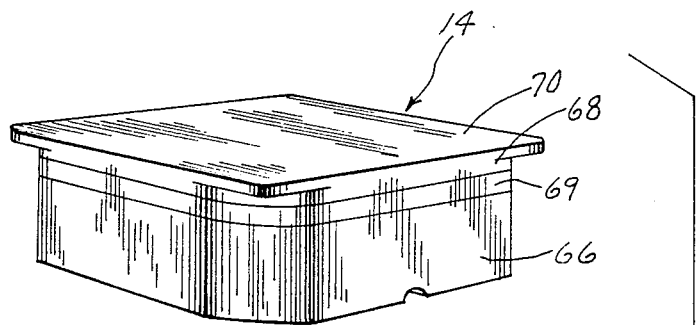
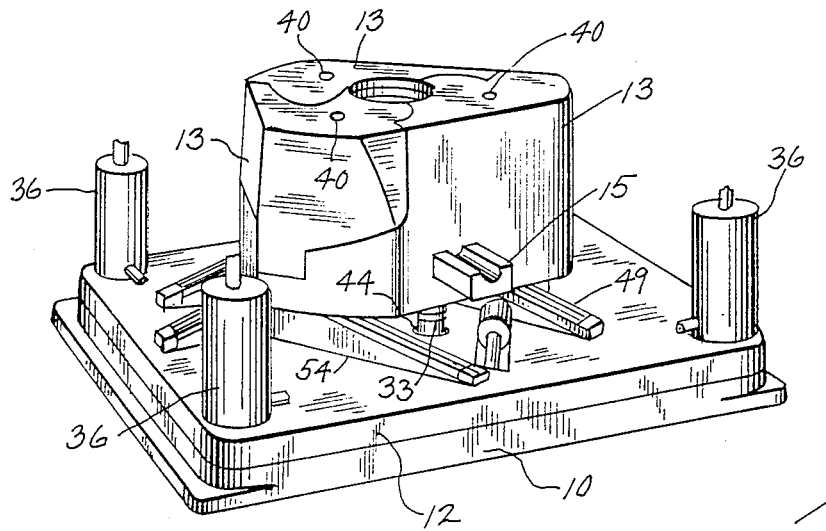
FIG. 3

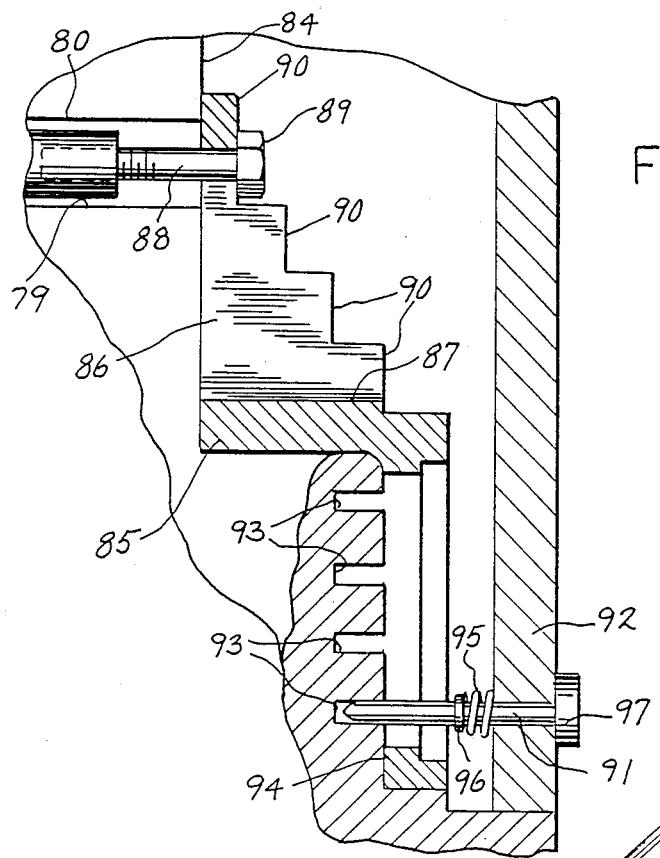
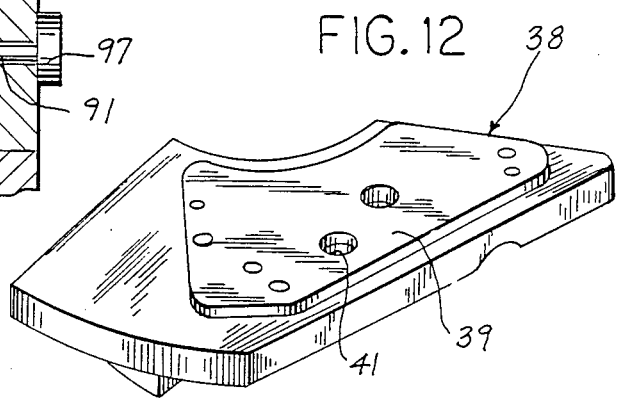
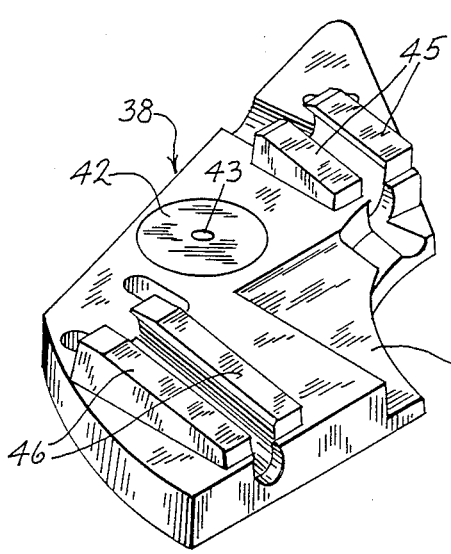
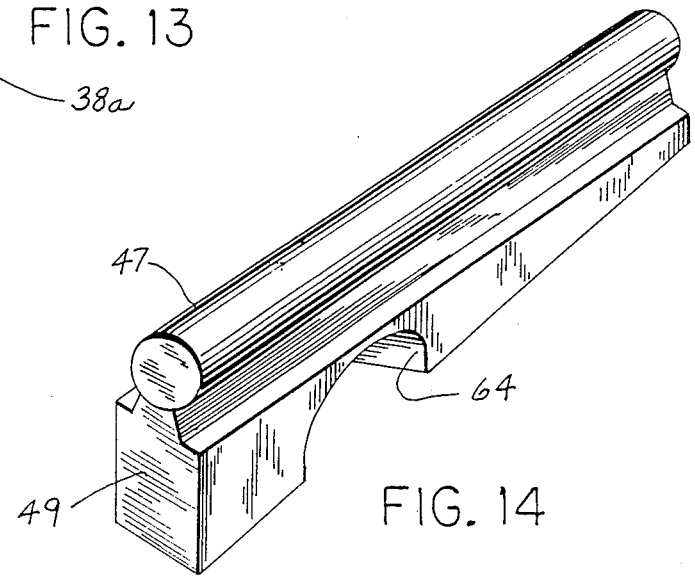

DIE ASSEMBLY FOR DIE CASTING A PROPELLER STRUCTURE

BACKGROUND OF THE INVENTION

Lost wax casting has been used in the past to produce propellers for marine engines. In the typical lost wax process, a wax propeller pattern is die cast and has a configuration identical to that of the metal propeller to be produced. The wax pattern is immersed in a ceramic bath and then dipped in sand to provide a stucco-like coating on the pattern. Six to eight coats of the sand-/ceramic coating are applied to the pattern to provide a ceramic shell. The composite structure is then heated to a temperature sufficient to melt the wax, and after draining of the wax, the ceramic shell is fired at an elevated temperature generally in the range of about 1700° F. After removal of the ceramic shell from the furnace, the molten metal is immediately poured into the shell to provide the cast metal - propeller.

Due to the configuration of the propeller and the pitch of the blades, one manner of producing the wax propeller pattern, as practiced in the past, was to employ a die that was split circumferentially of the hub and the die sections were pulled axially after casting of the wax pattern. With this die construction, the outwardly flared end on the hub could not be cast integrally with the remainder of the hub, so that the flared end was separately cast and then bonded to the remainder of the hub. To join the flared end to the hub, the abutting edges were provided with interlocking recesses and wax was then used to join the members. The resulting joint was then manually blended or feathered to provide a smooth contour between the hub and the flared end.

It is also desirable to be able to cast a logo into the hub of the propeller. However, when using axially drawn die sections, a logo could not be cast in the hub. Furthermore, the use of axially drawn die sections rquired that the hub have a slight draft as opposed to a pure cylindrical contour.

In order to overcome these problems, a modified die assembly was utilized for die casting wax propeller patterns. In the modified construction, three separate inserts were assembled from the top into the outer die sections, with each insert defining a third of the hub without blades. The blades in this die assembly were defined by the upper and lower dies. After casting, the upper and lower dies were moved axially and the inserts were then manually removed. This modified method enabled a flared end to be formed integrally with the hub, but resulted in the deposit of wax at the joint between the blades and the hub, which again had to be manually blended or feathered. In this process, the manually positioning of the inserts was a difficult and time consuming task, resulting in a substantial set-up time. In addition, the use of the separate inserts substantially increased the overall cost of the die assembly, because of the added number of movable die elements.

Another method used in the past to produce wax propeller patterns incorporated three separate die inserts, each mounted for sliding movement along horizontal guide tracks from an outer open position to an inner closed position where the inserts defined a die cavity in combination with a central core. In this construction, the die inserts were held in the closed position by angular wedge members that were carried by the press and engaged the outer surfaces of the inserts to wedge the inserts to the closed position. While this prior unit had the capability of casting the outwardly flared end of the hub integrally with the remainder of the hub, the die inserts had to be manually moved between the open and closed positions, and the core had to be manually stripped from the pattern with the result that the die casting operation had a relatively long cycle time.

In practice, a marine engine manufacturer may require a number of different families of propeller designs, with each family differing from other families by size, and each propeller within a given family differing by blade pitch. This can result in a total of perhaps 80 to 100 different propeller designs.

In the past, a separate and complete die assembly was required for each propeller design and thus the die cost for producing the wax propeller patterns was very substantial. Moreover, each complete die assembly could not be transported or handled by a single workman, with the result that it was necessary to use mechanical equipment, such as a fork lift truck or a hoist, to move the die assemblies into and out of the press.

Because of these problems there has been a distinct need for a die assembly for producing wax propeller patterns which is less costly, has a reduced set-up time and can be installed without the need of mechanical equipment.

SUMMARY OF THE INVENTION

The invention is directed to an improved die assembly for die casting articles, such as wax propeller patterns. The propeller pattern is identical in configuration to the cast metal propeller, and includes a generally cylindrical hub having an outwardly flared end and a plurality of blades extend outwardly from the hub.

The die assembly of the invention includes a base plate and a lower core section is mounted on the base plate and extends upwardly from the base plate through an opening in a stripper plate. The stripper plate is mounted for movement toward and away from the base plate, and a group of die sections are mounted on the upper surface of the stripper plate and are movable on inclined guide rails in a generally radial direction from an outer open position to an inner closed position where they define a die cavity in combination with the core section.

The die assembly also includes a vertically movable upper die unit and the lower surface of the upper unit is formed with a cavity which interlocks with the upper ends of the die sections when the die sections are in the closed position to prevent radial movement of the die sections. An upper core section is carried by the upper die unit and mates with the lower core section when the upper die unit is lowered into interlocking relation with the die sections.

Liquid wax is introduced to the die cavity through an ingate, and on solidification of the wax, a propeller pattern is produced.

On completion of the die casting operation, the upper die unit is elevated releasing the engagement with the die sections. The upper die unit is designed to move with a type of lost motion, in which the upper core section is moved before the die sections are released to strip the upper core section from the pattern. Following the release of the upper die unit, the stripper plate is moved upwardly relative to the base and lower core section to thereby strip the pattern from the lower core section. The die sections are then moved outwardly to their open position.

To reduce the overall size of the die assembly, a provision is made to rotate the lower core section and pattern after the die sections are in the open position. Due to the pitch of the blades, the die sections would have to be moved outwardly a considerable distance to enable the pattern to be axially removed from the core section. To reduce this distance of travel, the core and pattern are rotated after the die sections are open to index the blades into registry with the spaces between the open die sections, so that the pattern can then be conveniently removed from the core section.

The invention also includes locating means on the base plate, which is engageable with a locating element on each of the die sections when the die sections are in the closed position to ensure that the die sections are properly closed before the wax is injected into the die cavity.

As a further feature of the invention, a water system is utilized to introduce a cooling medium into both the upper and lower core sections during the die casting operation.

With the die assembly of the invention, the entire propeller pattern can be cast in a single operation, including the flared end of the hub and the blades. This eliminates the necessity of joining and blending independently cast sections, as required in certain prior practices, and as no blending is required, the resulting pattern has a smooth unblemished appearance.

As a further advantage, the die sections are moved radially, rather than axially, to the open position and this enables a logo to be embossed on the hub. As the die sections are not drawn in an axial direction, it is not necessary to provide draft for the hub, thereby providing the hub with a more attractive appearance.

With the invention, the same base plate, stripper plate, and upper die unit can be used for all of the propellers of a given family. Set-up is merely accomplished by installing the necessary center core and die sections, and each of these members can be conveniently attached through use of a single bolt. This substantially reduces the set-up time when changing from one propeller design to another.

Moreover, the set-up is accomplished merely by the substitution of the individual die sections which can be handled by a single workman, thus, eliminating the need for mechanical equipment during the setup operation.

As an important advantage, the die assembly of the invention provides better dimensional accuracy for the wax pattern, due to the fact that the blades of the pattern are not stressed axially, as can occur in prior practices where the dies were drawn axially.

Other objects and advantages will appear in the course of the following description.

BRIEF DESCRIPTION OF THE DRAWINGS

The drawings illustrate the best mode presently contemplated of carrying out the invention.

In the drawings:

FIG. 2 is a perspective view of the lower portion of the die assembly with the die sections being in the open position;

FIG. 3 is a perspective view of the die assembly with the die sections being in the closed position;

FIG. 12 is a perspective view of the upper surface of a slide;

FIG. 13 is a perspective view of the lower surface of a slide;

FIG. 14 is a perspective view of one of the inclined supports for the guide rails; and FIG. 15 is an enlarged fragmentary plan view of the base plate showing the adjusting mechanism for changing the magnitude of oscillation of the lower core section.

DESCRIPTION OF THE ILLUSTRATED EMBODIMENT

Figure 1:
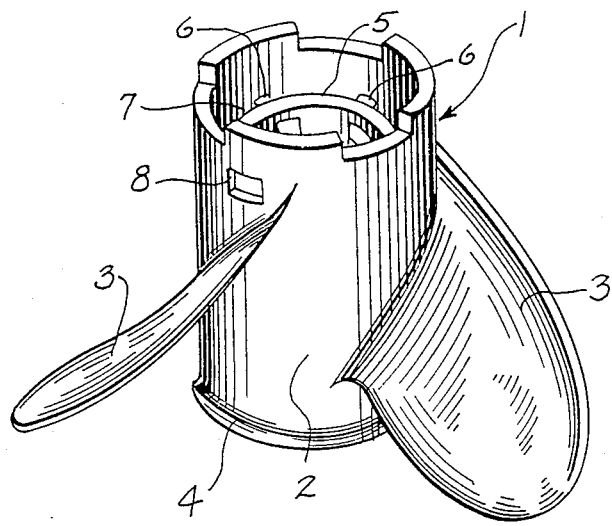
FIG. 1 is a perspective view of a wax propeller pattern to be produced through use of the die assembly of the invention.

The invention is directed to a die assembly having particular use for forming a wax pattern to be used in casting a propeller from a metal such as stainless steel. FIG. 1 illustrates a wax pattern 1 produced by the die assembly of the invention that can be utilized in a "lost wax" casting process to form a metal propeller. In a "lost wax" casting process, a series of layers of ceramic material are built up on the surface of pattern 1 to form a rigid ceramic shell. The composite structure is then heated, causing the wax to melt and drain from the ceramic shell. The hollow shell is then used as a mold for the molten metal in casting the metal propeller. Pattern 1, which is identical in configuration to the metal propeller to be cast, includes a generally cylindrical hub 2, which carries a plurality of blades 3. One end of the hub flares outwardly, as indicated by 4.

A central tube 5 is mounted concentrically within the hub by a plurality of radially extending ribs 6. Central tube 5, in the cast metal propeller, defines a drive hub cavity while the annular space between the tube 5 and hub 2 constitutes an exhaust/cooling water passage 7. Hub 2 can also be formed with a series of acceleration slots 8 which are spaced circumferentially of the hub, and in the cast metal propeller, permit a controlled volume of exhaust gas to flow onto the blades to aid in acceleration.

While the drawings illustrate a propeller pattern having an annular exhaust/cooling passage 7 and acceleration slots 8, the invention can also be used to produce a pattern without the passage 7 and slots 8.

The die assembly, as best shown in FIGS. 2 and 3, includes a base plate 10 and a generally cylindrical core 11 is mounted centrally of the base plate. A stripping plate 12 is disposed above base plate 10 and is adapted to be moved vertically relative to the base plate and core 11. Stripping plate 12 carries a plurality of die sections or inserts 13 which can be moved relative to each other from an outer open position to an inner closed position where they are spaced from the core to provide a die cavity therebetween.

The die assembly also includes an upper die unit 14 which is adapted to engage the die sections 13 when they are in the closed position and the upper unit 14 is raised and lowered through use of a conventional press, not shown, which is attached to the upper unit 14.

The liquid wax employed to produce the pattern 1 is introduced into one of the die sections through an ingate 15 and travels through a series of runners to the die cavity. The manner of feeding the wax to the die cavity is conventional, and is not shown in detail in the drawings.

As shown in the drawings, the die assembly includes three die sections 13 and the inner surface of each die section has a cavity 16 which defines one of the blades 3, as well as a portion of the hub 2, of the propeller pattern. In addition, the inner surface of each section 13 is provided with a projection 17 that forms one of the acceleration slots 8.

Figure 6:
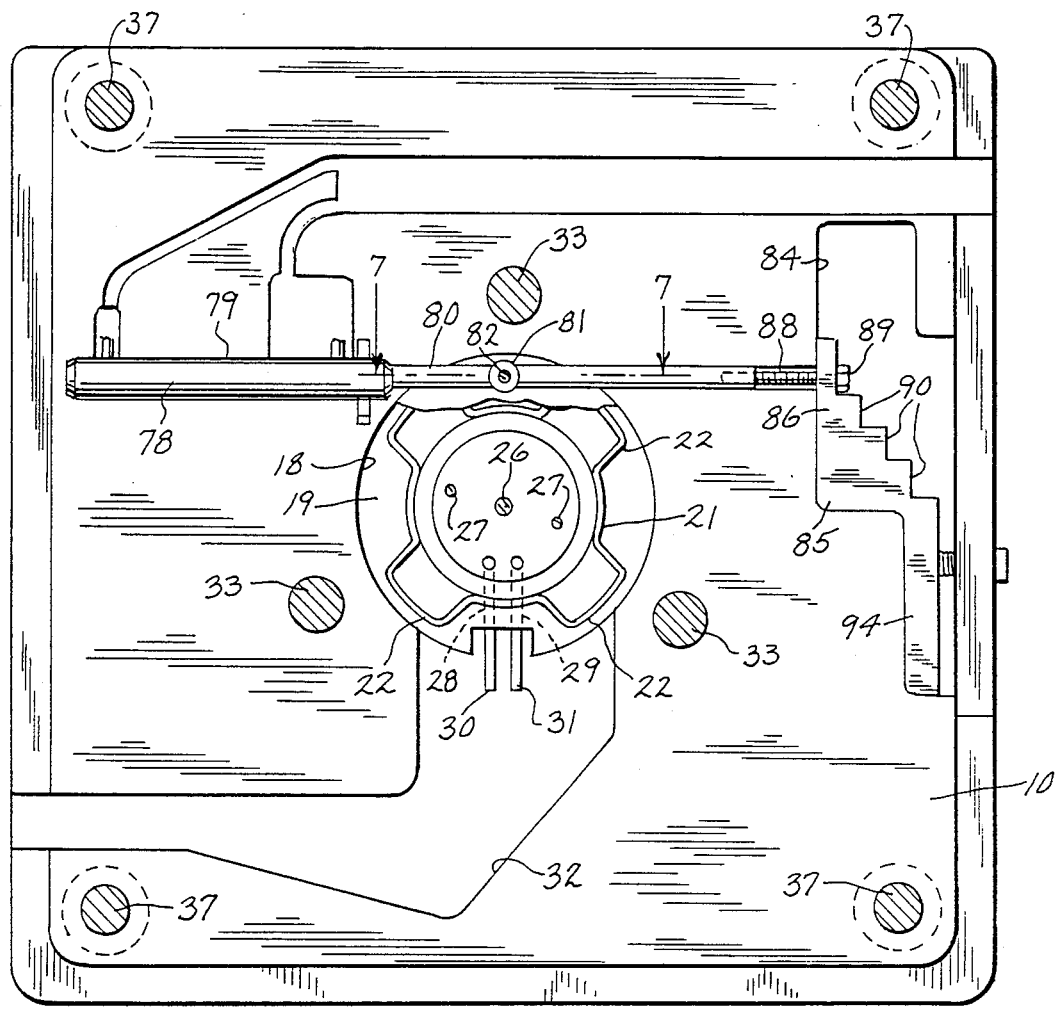
FIG. 6 is a plan view of the upper surface of the base plate with parts broken away.
Figure 7:
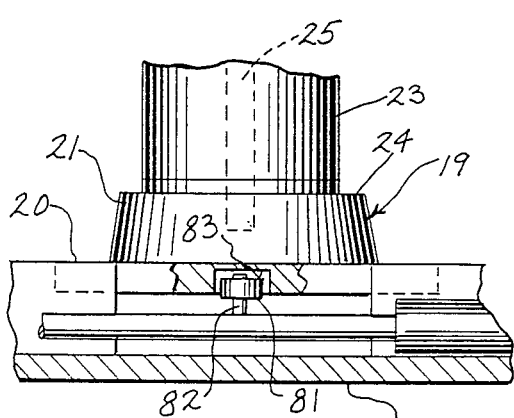
FIG. 7 is a section taken along line 7—7 of FIG. 6.

Base plate 10 is provided with a central circular recess 18, which receives a core base 19 which is fixed to the base plate. As best shown in FIGS. 6 and 7, the core base includes a lower generally cylindrical section 20 which is received within recess 18 and an upper section 21 which projects upwardly from lower section 20 above the surface of base plate 10. The outer surface of upper section 21 is formed with a series of outwardly extending ears or lobes 22 which are adapted to mate with recesses formed in the bottom surface of stripper plate 12, as will be hereinafter described.

Core 11 is continuous and includes a lower section 23 which is supported on upper surface 24 of core base 19, and the lower section 23 is secured to the core base 19 by an elongated bolt 25 which extends downwardly through core section 23 and is threaded within a hole 26 in the core base 19.

To properly orientate lower core section 23 with respect to base plate 10, a pair of dowels 27 extend upwardly from the core base 19 and are received within suitable holes in the bottom surface of lower core section 23.

A cooling medium, such as water, is adapted to be introduced into the lower core section 23 and in this regard, a pair of water passages 28 and 29 are formed in the lower section 20 of core base 19 and the inner ends of passages 28 and 29 have upwardly facing outlets located inwardly of the supporting surface 24. Water lines 30 and 31 are connected to passages 28 and 29, respectively, and extend outwardly to the exterior through a recess 32 formed in the upper surface of base plate 10.

Three locator pins 33 are positioned outwardly of core base 19 and project upwardly from base 10. Each locator pin is provided with a generally tapered upper tip which is adapted to engage one of the die slides 38, as will be hereinafter described, to properly locate the die section in its closed position.

Stripper plate 12 is adapted to be moved vertically relative to base plate 10. To provide this movement, a cylinder 36 is mounted at each corner of the stripper plate, and a piston rod or ram 37, which is slidable in each cylinder 36, extends downwardly through a hole in the stripper plate and is connected to the base plate 10. By introducing fluid into the upper end of each cylinder 36, the rams 37 will be extended to raise the stripper plate upwardly relative to base plate 10. Conversely, retraction of the rams 37 will move the stripper plate 12 downwardly toward base plate 10.

Each die section 13 is carried by a slide 38 that is mounted for sliding movement relative to stripper plate 12. As shown in FIG. 12, the upper surface of each slide 38 is provided with an upstanding pad 39 which is received within a correspondingly shaped recess formed in the lower surface of the respective die section 13. The engagement of pad 39 with the recess will locate the die section properly relative to the slide and prevent relative rotation. The die section is secured to the slide by a single bolt 40, which extends downwardly through an opening in the die section and is threaded within a hole 41 in the slide.

Formed in the lower surface of each slide 38 is a recess which receives a generally circular disc 42. Disc 42 is formed with a tapered hole 43 which receives the upper tip of the respective locator pin 33. Pin 33 extends through a suitable opening 44 in stripper plate 12. (See FIG. 3) Engagement of the locator pins 33 with the holes 43 in the slides 38 ensures that the die sections 13 are properly positioned when closed. When the die sections are in their closed position, the adjacent machined side edges of the die sections are in sealing engagement to prevent leakage of wax through the joint therebetween.

Figure 9:
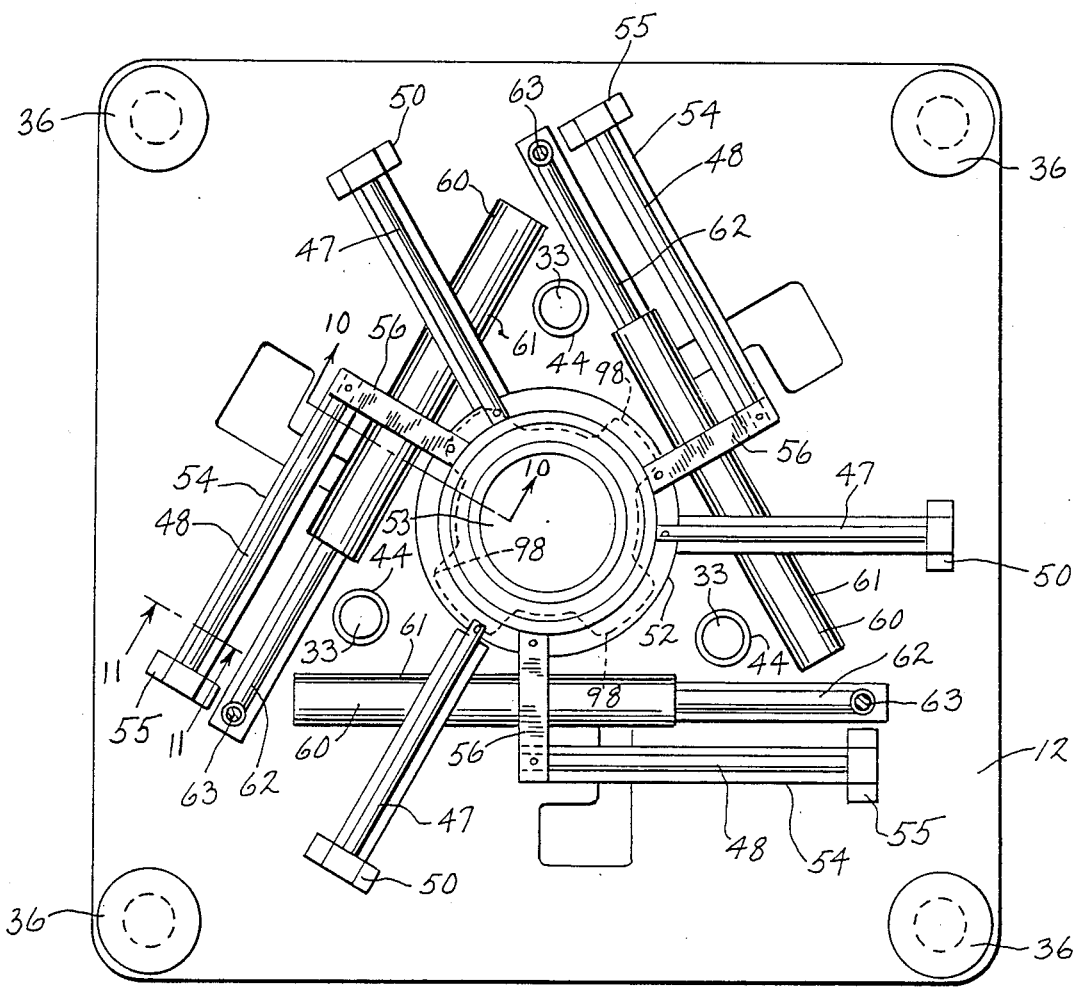
FIG. 9 is a plan view of the upper surface of the stripper plate and showing the mechanism for guiding and moving the die sections.

Die sections 13 are movable between the open position and the closed position and to guide the die sections in movement, the bottom surface of each die section carries two pair of spaced guide members 45 and 46, as shown in FIG. 13. As seen in FIG. 9, each pair of guide members 45 is adapted to slide on a rail 47 fixed to the stripper plate 12, while each pair of guide members 46 slides on a rail 48 which is also fixed to the stripper plate.

As illustrated in FIGS. 9 and 14, rails 47 are generally circular in cross section and each rail 47 is secured to the upper surface of an inclined support member 49. The upper surface of support member 49 slopes downwardly and outwardly at an angle of about 11° to the horizontal.

The outer end of each rail 47 is connected via a bracket 50 to the upper surface of stripper plate 12, while the inner end of each rail 47 is secured by screw to the upper edge 51 of a ring 52 which borders a central passageway 53 in stripper plate 12.

Figures 10, 11:
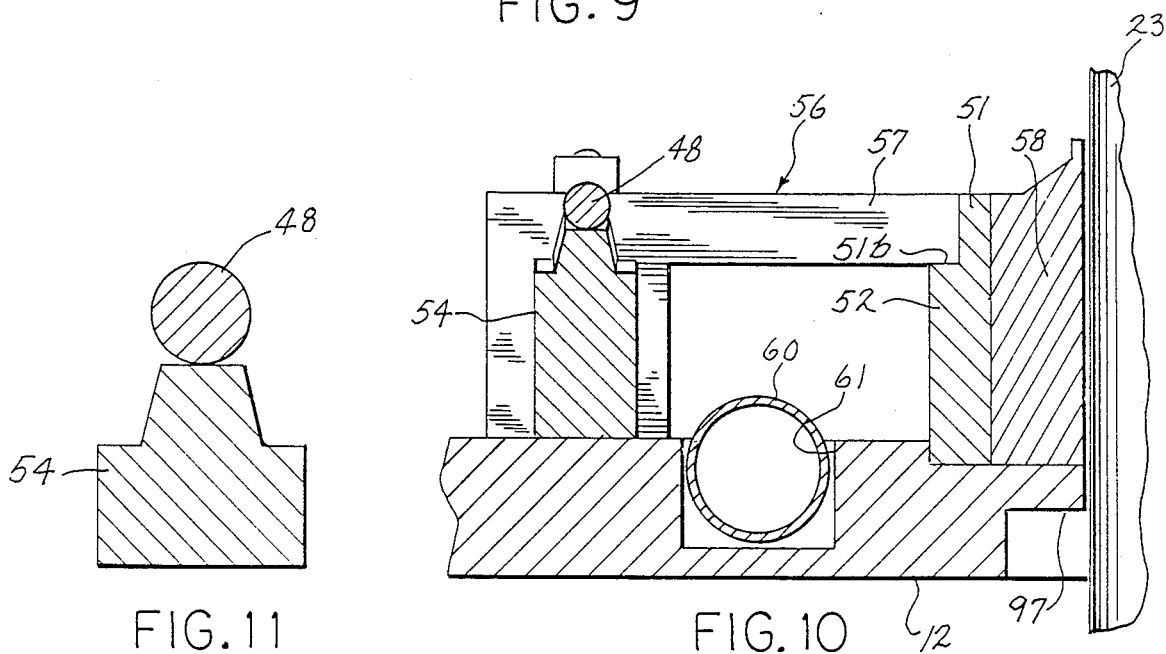
FIG. 10 is a section taken along line 10—10 of FIG. 9.
FIG. 11 is a section taken along line 11—11 of FIG. 9.

The rail 48 associated with each die section 13 is circular in cross section and is supported on the upper surface of an inclined support member 54. The outer end of each rail 48 is secured through a bracket 55 to the upper surface of stripper plate 12, while the inner end of rail 48 is secured to the upper surface of a generally L-shaped arm 56. The horizontal leg 57 of arm 56 extends radially inward and is secured within a notch 51b in the upper edge 51 of ring 52, as shown in FIGS. 8 and 10.

The die sections 13 are not moved in a precise radial direction when moving from the open to the closed position. This can be seen in FIG. 9, where a line parallel to the guide rails 47 and 48 and midway therebetween is offset from the axis of the passageway 53 and core 11. This angularity is important in pulling or withdrawing the die sections 13. Further, the incline of the guide rails enables the assembly to mold patterns with both higher and lower pitch blades. Without the inclined guide rails, lower pitch blades could not be produced. Thus, the construction of the invention has increased versatility, enabling a variety of propeller configurations to be produced using the same base plate, stripper and guide system, and only requiring a change of die sections.

Figure 8:
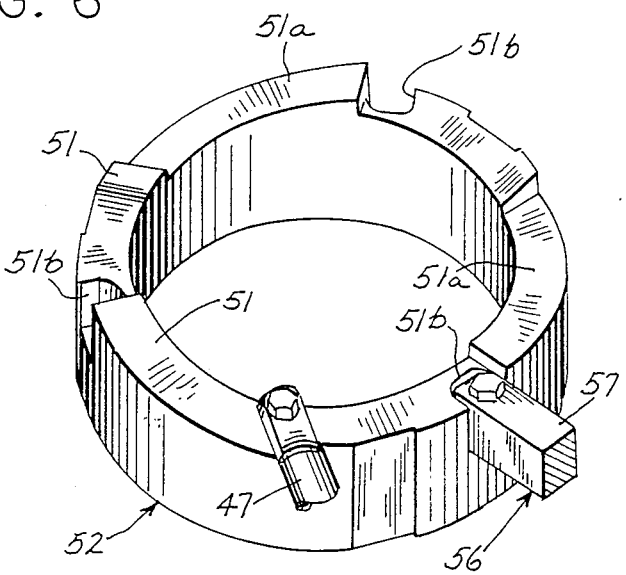
FIG. 8 is a perspective view of the ring which borders the central opening in the stripper plate.

The upper edge 51 of ring 52 is formed with a series of inclined surfaces 51a, as shown in FIG. 8, and the inclined surfaces mate with surfaces 38a or the lower end of the respective die slides 38, when the die sections are in the closed position.

A ring 58, preferably formed of a material such as bronze, is located inwardly of ring 52 and is secured to stripper plate 12. Ring 58 serves as a bushing for rotation of the lower core section 23 relative to the stripper plate 12. In addition, the ring 58 serves as a guide for the sliding movement of the stripper plate 12 relative to core section 23 and pattern 1 as the stripper plate is elevated relative to base plate 10.

To move the die sections 13 from the outer to the inner positions, a fluid cylinder 60 is associated with each die section. Each cylinder 60 is mounted in a recess 61 formed in the upper surface of stripper plate 12 and a piston rod 62 which extends outwardly from each cylinder 60 is connected through a linkage 63 to the bottom surface of the respective slide 38. By introducing fluid, such as air, into one end of the cylinder 60, piston rod 62 will be retracted to move the slide and the die section 13 from the open to the closed position.

As best shown in FIG. 10, the upper surface of each cylinder 60 projects above the upper surface of stripper plate 12 and because of this, the lower surface of each rail support 49 is provided with an arch 64 (See FIG. 14) which receives the cylinder associated with the next adjacent die section. In addition, the upper surface of each cylinder 60 extends beneath the leg 57 of the L-shaped arm 56 of that die section, as illustrated in FIG. 10.

Figure 4:
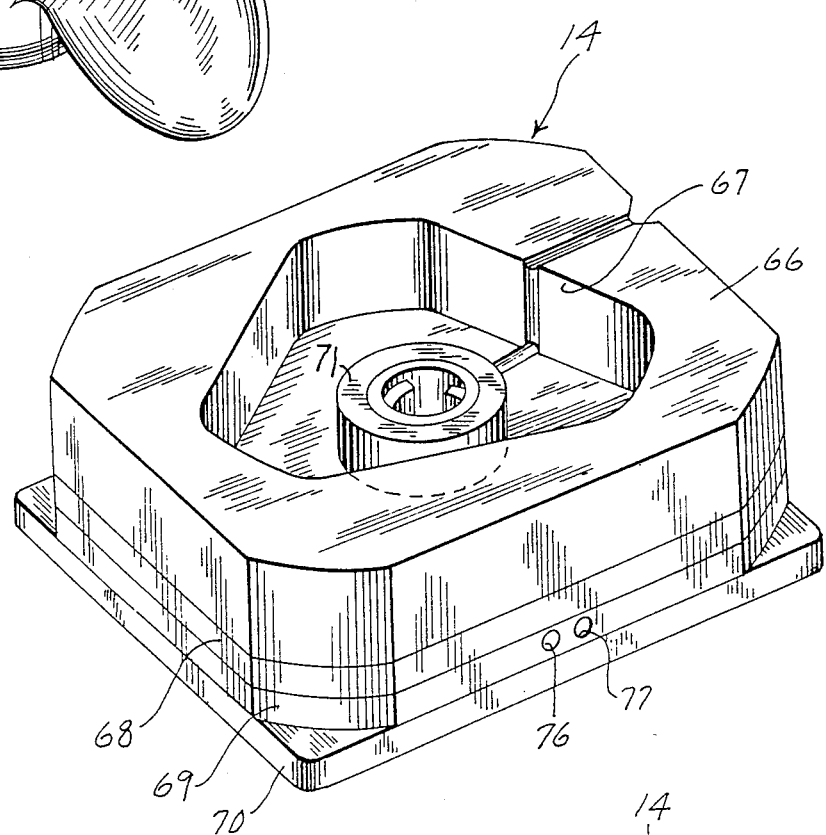
FIG. 4 is a perspective view of the bottom surface of the upper die section.
Figure 5:
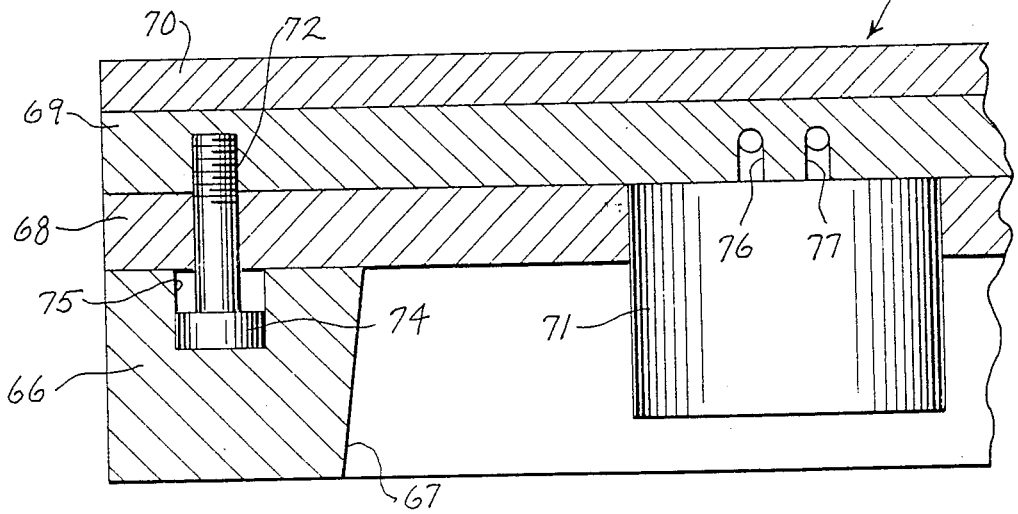
FIG. 5 is an enlarged fragmentary verticl section of the upper die unit.

Upper die unit 14 includes a lower locking plate 66 which is provided with a central opening 67 having a shape to complement the upper ends of the die sections 13 when the die sections are in the inner or closed position. FIG. 4 is a view of the bottom surface of the upper die unit 14. As best shown in FIG. 5, the wall of plate 66 bordering opening 67 is tapered downwardly and outwardly, and the taper acts to force the upper ends of the die sections 13 into the fully closed position.

Secured to the upper surface of locking plate 66 is a plate 68 and plate 68, in turn, carries a plate 69. Top plate 70 is mounted by bolts, not shown, to the upper surface of plate 69 and is secured to the press.

The upper section 71 of core 11 is carried by the plate 69 and when the upper die unit 14 is lowered, and the upper ends of the die sections 13 are received within the opening 67, the lower surface of upper core section 71 will mate with the upper surface of the lower core section 23.

To provide a stripping action for release of the wax pattern 1 after the molding operation, a series of shoulder bolts 72 extend through openings in plate 68 and are threaded within aligned openings in plate 69, as best seen in FIG. 5. The head 74 of each shoulder bolt 72 is disposed within a recess 75 formed in the upper surface of plate 66. Recess 75 has a greater depth than the head 74, so that on upward movement of the plates 69 and 70, plate 68 and locking plate 66 will not move upward until the head 74 of the bolt engages the lower surface of plate 68. This provides a lost motion type of movement which will release the upper core section 71, which is carried by plate 69 before the locking plate 66 releases the upper ends of the die sections 13.

Plate 69, which carries the upper core section 71, is provided with a pair of water passages 76 and 77 which extend radially within the plate and communicate with the interior of the core section 71. A cooling medium, such as water, is adapted to be introduced into the upper core section 71 through passage 76 and withdrawn therefrom through the passage 77.

After the molding operation, the upper die unit 14 is elevated and the die sections 13 are moved outwardly to the open position. The wax pattern 1 is then removed axially from the lower core section 23. Due to the pitch of the blades 3, the die sections 13 would have to be moved outwardly a substantial distance to enable the pattern to be removed. To provide a more compact machine, a provision is made to rotate the lower core section and pattern 1 after the die sections 13 are opened to move the blades 3 of the pattern into registry with the gaps between the open die sections. This enables the pattern to be removed axially from the lower core section 23 without interference from the open die sections and reduces the necessary length of travel of the die sections from the closed to the open positions.

To provide this rotational movement, a cylinder 78 (see FIG. 6) is mounted within a recess 79 in the upper surface of base plate 10. A piston is slidable within cylinder 78 and carries a piston rod 80 that extends outwardly from the cylinder through recess 79. As shown in FIG. 7, a follower 81 is rotatably mounted on the central portion of piston rod 80 via pin 82 and follower 81 rides within a generally oval groove 83 formed in the lower surface of core base 19. With this construction, extension and retraction of piston rod 80 will rotate the core base 19 and lower core section 23 about the axis of the core.

Depending on the pitch of the blades 3 of the pattern 1 being molded, the stroke of the piston rod 80, and thus the rotation of the core section 23, can be controlled by an adjusting mechanism mounted in the base plate 10. As shown in FIGS. 6 and 15, a recess 84 communicates with recess 79 and a stop bracket 85 is mounted within recess 84. One leg 86 of stop bracket 85 is formed with an elongated slot 87 and a bolt 88 extends through slot 87. Bolt 88 is threaded in an opening in the end of piston rod 80 and the head 89 of the bolt is adapted to engage one of a series of steps 90 formed on leg 86. Engagement of head 89 with one of the steps 90 will determine the stroke of the piston rod 80 and thus the magnitude of oscillation of core base 19 and lower core section 23.

Stop bracket 85 is adapted to be moved longitudinally in recess 84 to position any one of the steps 90 in registry with the bolt 88. To adjust the position of stop bracket 85, a locking pin 91 extends through a hole in cover plate 92 and the inner end of the locking pin is adapted to engage one of a series of spaced holes 93 formed in leg 94 of bracket 85. A coil spring 95 is positioned around the stem of the pin 90 and is interposed between the inner surface of cover 92 and a collar 96 mounted on the pin. The force of the spring will urge the end of the pin 91 into engagement with the hole 93. By pulling outward on the head 97 of the pin 91, the pin can be released from the hole 93 and the stop bracket 85 can then slide within the recess 84 to thereby position one of the steps 90 in alignment with the path of travel of the piston rod 80 and bolt 88. This adjustment varies the stroke of the piston rod 80 and thus serves to regulate the amplitude of rotation of the core section 23 and pattern 1.

The lower surface of stripper plate 12 bordering passageway 53 is formed with a plurality of recesses 98 which receive the lobes 22 on core base 19 when the stipper plate is in its lower position. Registry of lobes 22 with recesses 98 insures that the core base and lower core section 23 are in the proper angular orientation with respect to the stripper plate after removal of the pattern and return of the core base and lower core section from the rotated position.

Operation

Core sections 23 and 71 are bolted to the core base 19 and upper die unit 14, respectively, and the die sections 13 are bolted to the respective slides 38. In each case only a single bolt is required to secure the core section and die section to their supporting members.

At the start of the molding cycle, the die sections 13 are in an open condition and the stripper plate 12 is in a raised position above the upper surface of base plate 10. Cylinder 78 is operated to rotate the core base 19 and lower core section back to their starting or home position.

Cylinders 60 are then operated to move the die sections 13 along the guide rails 47,48 to the closed position. In the closed position, the adjacent machined side edges of the die section are in tight sealing engagement, and the surfaces 38a of slides 38 are engaged with surfaces 51a of ring 52. Cylinders 36 are then operated to lower stripper 12 onto base plate 10. In the lower closed position, locator pins 33 will engage holes 41 in slides 38 to insure that the die sections are properly located in the closed position.

Upper die unit 14 is then lowered causing the upper ends of the closed die sections 13 to be received within the opening 67 in locking plate 66.

Liquid wax is then introduced into the die cavity through the ingate 15 and cooling water can be introduced to the core sections 23 and 71 through the water passages 28,29 and 76,77.

After solidification of the pattern 1, the upper die unit 14 is elevated and, as previously noted, the initial upward movement of the press will draw the upper core section 71 upwardly relative to the lower core section and the die sections 13, thus providing a stripping action. Continued upward movement of the die unit 14 will then elevate the locking plate 66 to release the locking engagement with the upper ends of the closed die sections 13.

Stripper plate 12 is then moved upwardly relative to base plate 10 and lower core section 23 through operation of cylinders 36 and this action will act to strip the pattern 1 from the lower core section 23.

With the stripper plate 12 in an upper position, cylinders 60 are then operated to move the die sections 13 to the open position and cylinder 78 is then operated to rotate the core base 19 and core section 23, along with the pattern 1, so that the blades of the pattern will be in registry with the gaps between the open die sections 13. With the pattern rotated, the pattern can then be drawn axially from the core section 23 without interference from the open die sections.

The invention provides distinct advantages over methods as used in the past to produce wax patterns for casting of metal propellers. Through the invention, the entire pattern, including the flared end 4 of the hub and the blades 3 can be cast in a single molding operation. This substantially reduces the finishing operations that have been necessary in the past in order to join separately molded components of the propeller pattern. As previously noted, the prior procedure required that the individually components, such as the flared hub end and/or blades be joined to the hub with wax and the joint then had to be carefully blended to eliminate surface imperfections at the joint.

Due to the configuration of the die sections 13, and the manner in which the die sections are opened and closed, it is possible to emboss a logo on the hub, which was not formerly possible when the dies were drawn axially.

The invention also enables the hub 2 of the pattern to be produced without draft, which provides a cleaner and more attractive appearance for the cast metal propeller.

As an important advantage, the same base plate 10 and guides, stripper plate 12, and upper die unit 14 can be utilized for the manufacture of propeller patterns of different sizes and different blade pitches. This substantially reduces the overall cost of the pattern making operation. Moreover, the set-up time is substantially reduced, as die sections and cores can be readily assembled and disassembled through use of a single bolt for each part.

Moreover, the individual die sections 13 are of a size such that they can be lifted and handled by a workman. In the past, when using a separate complete die assembly for each propeller pattern, the die assemblies could not be handled by a single workman and had to be transported by mechanical equipment, such as a hoist or fork lift truck.

The die assembly of the invention also provides improved dimensional accuracy for the wax pattern in that the blades are not stressed due to axial drawing of the die section, so there is less tendency for distortion of the blades of the pattern.

While the invention has particular use for die casting wax propeller patterns, it can also be used to die cast metal propellers, as well as producing injection molded plastic propellers. Thus, the term "propeller structure" as used in the claims is intended to cover both a propeller pattern or a propeller.

Various modes of carrying out the invention are contemplated as being within the scope of the following claims particularly pointing out and distinctly claiming the subject matter which is regarded as the invention.

I claim:

1. A die assembly for molding a propeller structure, comprising die means defining a cavity having a propeller configuration including a hub and a plurality of blades extending outwardly from said hub, said assembly comprising a base, a core projecting upwardly from said base, a plurality of die sections, guide means for mounting said die sections for movement in a path relative to said core from an open position to a closed position where said die sections are spaced radially from said core to provide said die cavity therebetween, drive means for moving said die sections from the open to the closed position, an upper die unit having an opening to receive the upper ends of said die sections when said die sections are in the closed position, and means for feeding a molten material to the die cavity to thereby mold said propeller structure.

2. The assembly of claim 1, and including a stripper plate mounted for movement relative to said base, said stripper plate having an passageway to slidably receive said core, said die sections being mounted on said stripper plate, said assembly also including means for moving said stripper plate relative to said base in a direction longitudinal of the axis of said core.

3. The assembly of claim 1, wherein said guide means is constructed and arranged to guide said die sections in an inclined path of movement from said open position to said closed position.

4. The assembly of claim 1, wherein each die section has a cavity that defines a blade and a portion of said hub.

5. The assembly of claim 1, wherein each of said sections being movable chordwise of said core.

6. The assembly of claim 1, wherein said guide means comprises a guide track for each die section, each guide track extending generally chordwise of said core and sloping downwardly and outwardly from said core.

7. The assembly of claim 1, and including a slide for each die section, and means for removably securing each die section to a respective slide, said slide being movable on said guide means.

8. The assembly of claim 7, wherein said guide means comprises a guide element on each slide and a second guide element on said stripper plate, said second guide element being engaged with said first guide element.

9. The assembly of claim 8, wherein said drive means comprises a fluid actuated cylinder connected to each slide.

10. The assembly of claim 1, and including rotating means for rotating said core about its axis when said die sections are in the open position.

11. The assembly of claim 10, wherein said rotating means comprises a core base to support the core, means for mounting said core base for rotation relative to said base, and actuating means connected to said core base for rotating said core base and said core.

12. The assembly of claim 11, wherein said actuating means comprises a fluid actuated cylinder, piston means mounted for movement within said cylinder and including a piston rod, follower means mounted for rotation on said piston rod, and recess means formed in said core base and disposed to receive said follower means, extension and contraction of said piston rod causing said follower to rotate said core base relative to said base.

13. A die assembly for molding a propeller structure, comprising die means defining a cavity having a propeller configuration including a central hub and a plurality of blades extending from said hub, said die assembly including a base plate, a stripper plate disposed parallel to said base plate, first drive means for moving said stripper plate toward and away from said base plate, a generally cylindrical core projecting from said base plate and extending through a passageway in said stripper plate, a plurality of die sections carried by said stripper plate, guide means on said stripper plate for mounting the die sections for generally radial movement from an open position to a closed position where said die sections form an outer closed die spaced from the core to provide said die cavity therebetween, second drive means for moving said die sections from the open to the closed positions, upper die means to engage the upper ends of said die sections when in the closed position, and means for feeding a material to said die cavity to mold said propeller structure.

14. The assembly of claim 13, and including a slide for each die section, and means for removably securing each die section to a slide, said slides being mounted for movement on said guide means.

15. The assembly of claim 14, and including non-circular locating means interconnecting each die section and the corresponding slide for locating said die section relative to said slide.

16. The assembly of claim 13, and including locating means disposed on said base pate, and receiving means on each die section to receive said locating means when said die sections are in the closed position.

17. The assembly of claim 16, wherein said locating means comprises a pin for each die section, said pins projecting upwardly from said base plate, said receiving means comprising a recess in each die section to receive the respective pin.

18. The assembly of claim 17, and including an opening in said stripping plate to slidably receive each pin.

19. A die assembly for molding a propeller structure for a marine engine, said propeller structure including a central hub and a plurality of blades extending outwardly from said hub, said die assembly comprising a base, a generally cylindrical core projecting upwardly from said base, a plurality of die sections, each die section including a cavity defining a blade and a portion of the hub of the pattern, guide means for mounting said die sections for generally lateral movement relative to the axis of said core from an open position where said die sections are spaced apart to a closed position where the side edges of said die sections are in engaged relation and said die sections form a die cavity with said core, means for feeding a material to said die cavity to mold a propeller structure, and means for rotating the core and the structure when the die sections are in the open position to thereby index said blades into registry with the spaces between the open die sections.

20. The assembly of claim 19, and including a core base mounted for rotation on said base, means for securing the lower end of said core to said core base, and actuating means operably connected to the core base for rotating the core base and the core.

21. The assembly of claim 19, and including adjusting means for adjusting the magnitude of rotation of said core base.

22. The assembly of claim 20, wherein said actuating means comprises a fluid cylinder, a piston rod extending from said cylinder, a follower mounted for rotation on said piston rod, and recess means disposed in said core base, said follower disposed in said recess means, extension and contraction of said piston rod acting to rotate said core base.

23. The assembly of claim 22, and including an adjustable stop means for adjusting the magnitude of rotation of the core base, said adjustable stop means including a plurality of spaced stop members, and means for adjusting the position of said stop members to selectively position individual stop members in the path of travel of said piston rod.

24. A die assembly for molding a propeller structure, comprising die means defining a cavity having a propeller configuration including a central hub and a plurality of blades extending outwardly from said hub, said die assembly comprising a base, a lower core section extending upwardly from said base, a plurality of die sections, guide means for mounting the die sections for generally radial movement with respect to the axis of the core section from an open position where said die sections are spaced apart to a closed position where said die sections are spaced radially of said core to provide said die cavity therebetween, drive means for moving said die sections between the open and closed positions, an upper die unit having locking means to engage the upper ends of said die sections when in the closed position, an upper core section carried by said upper die unit and engageable with said lower core section when said upper die unit is engaged with the upper ends of said die sections, and means for feeding a molten material to the die cavity to mold a propeller structure.

25. The assembly of claim 24, and including means for introducing a cooling medium to at least one of said core sections.

26. The assembly of claim 24, wherein said locking means comprises a recess in the lower surface of said upper die unit and surrounding said upper core section, said recess being constructed and arranged to receive the upper ends of said die sections and prevent movement of said die sections to the open position.

27. The assembly of claim 26, wherein said recess is bordered by a wall sloping downwardly and outwardly.

* * * * *